Aug. 5, 1952     B. L. DILL     2,605,527
SAFETY CATCH
Filed June 12, 1950
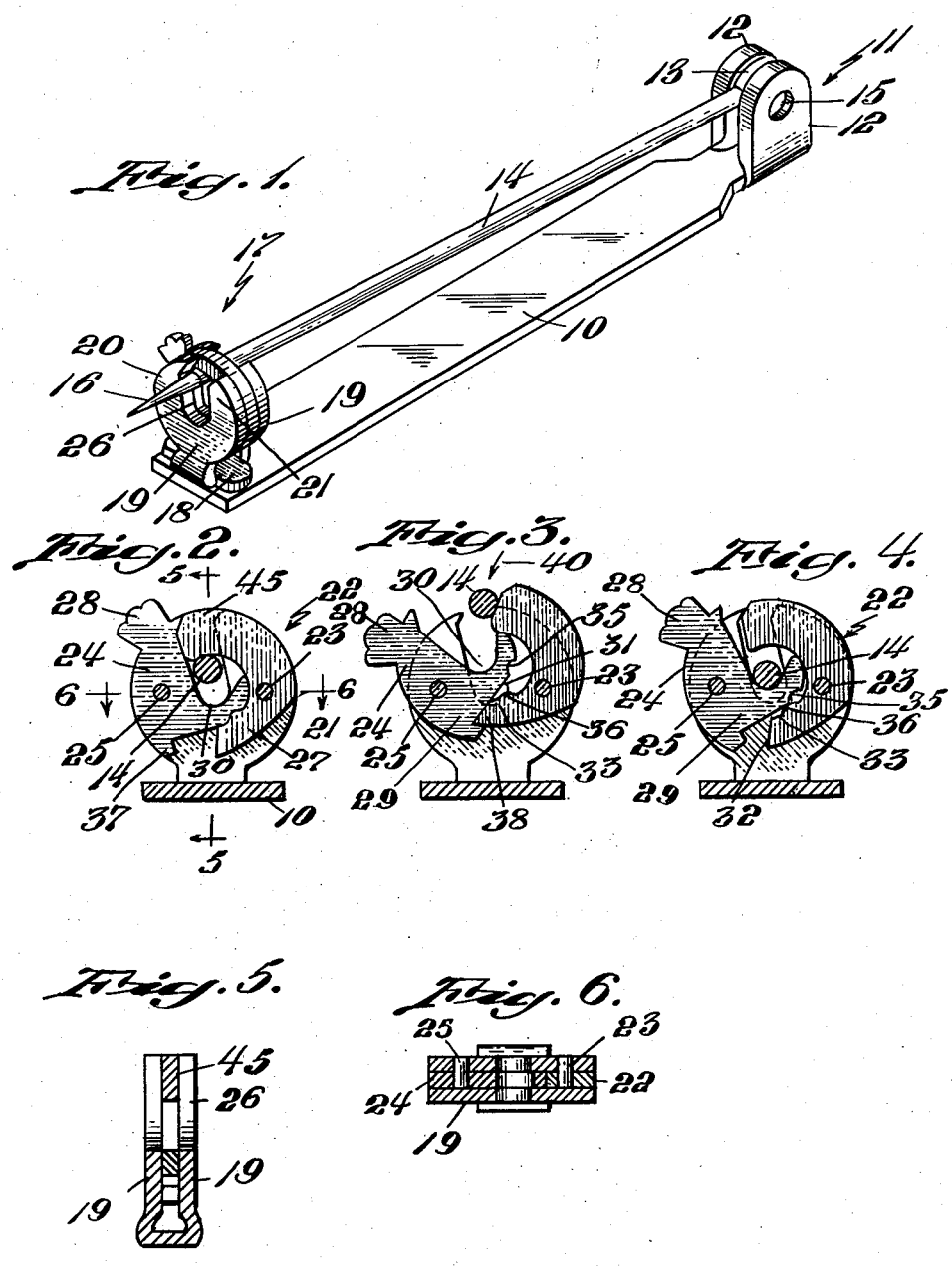
INVENTOR.
Bernard Leroy Dill
BY
Barlow & Barlow
ATTORNEYS.

Patented Aug. 5, 1952

2,605,527

UNITED STATES PATENT OFFICE 2,605,527

SAFETY CATCH

Bernard Leroy Dill, East Greenwich, R. I.

Application June 12, 1950, Serial No. 167,592

7 Claims. (Cl. 24—157)

This invention relates to a safety catch of the type used for securing a pin stem in closed position and is a continuation-in-part of my copending application, Serial No. 23,720, filed April 28, 1948.

Safety catches have been provided in various forms and usually require some manual manipulation in order to position the safety catch in locked position.

One of the objects of this invention is to provide a safety catch which may be moved to locked position upon insertion of the pin stem into the catch although requiring some manual manipulation in order to release the pin stem from such locked position.

Another object of this invention is to provide a safety catch which will be of simple operation so that the inexperienced person may readily operate the same even without looking at the catch to do so.

Another object of the invention is to provide a safety catch which may be of relatively simple mechanical construction and simply assembled.

Another object of this invention is to provide a latch and gate which will be so located in their open position that when a pin is inserted, the parts will move to closed position.

With these and other objects in view, the invention consists of certain novel features of construction, as will be more fully described and particularly pointed out in the appended claims.

In the accompanying drawings:

Figure 1 is a perspective view of a pin stem, its joint, and the catch which is the subject of this invention;

Figure 2 is a sectional view showing the parts in closed position, as shown in Figure 1;

Figure 3 is a view similar to Figure 2 but showing the parts in open position with the pin stem about to move into the catch;

Figure 4 is a view similar to Figure 3 but showing the pin stem as having advanced into the catch and in the position which it assumes in forcing the catch to closed position;

Figure 5 is a sectional view on line 5—5 of Figure 2; and

Figure 6 is a sectional view on line 6—6 of Figure 2.

In proceeding with this invention I provide a pair of arms extending from a base in generally parallel relation to provide an opening between the arms extending from their ends distant from the base so that a pin stem may be inserted in this space between the arms in a movement toward the base for the arms. A gate is pivoted on one of the arms so as to swing across the space between the arms over the pin stem and provide a closure for the opening between the arms which receive the pin stem. A latch is pivoted on the other arm and in the same plane with the gate to lock the gate in closed position and also has a portion which is located to slide along the gate and move the gate to its closed position and then lock it in this position. In order that the parts may maintain the relative position desired, they are so shaped as to engage one with the other when swung to open position so that when engaged or in stopped relation, they will be in a position to receive the pin stem. The latch manipulates the gate, while the pin stem manipulates the latch.

With reference to the drawings, I have illustrated a bar 10 which may have an ornamental face or a mounting upon which some ornament may be provided. A pin stem joint designated generally 11 is secured to the back of the bar and comprises a pair of ears 12 between which the eye 13 of the pin stem 14 is pivotally mounted by means of a pivot 15. This pin stem has a pointed end 16, which end is held by the safety catch 17 which is the subject of this invention.

This safety catch comprises a base 18 from which ears 19 are bent upwardly. Each of these ears 19 comprises spaced arms 20 and 21. A gate 22 is pivoted on one or both arms 21 at 23, while a latch 24 is pivoted as at 25 on one or both of the arms 20. This gate and latch are best shown in Figures 2, 3, and 4. The head portion of the gate 45 on one side of the pivot 23 is so arranged that it may extend across the opening 26 between the arms 20 and 21 so that the pin stem 14 will be blocked from removal from between the arms when this gate is in the position shown in Figure 2. The gate 22 extends downwardly providing a tail as at 27 on the other side of pivot 23 into the path of movement of the latch.

The latch 24 has a handle 28 for manual manipulation extending outwardly from the portion adjacent opening 26 beyond the arm 20 upon which it is pivoted while the portion 29 of latch 24 on the other side of the pivot 25 has a curved recess 30 which may be engaged by the pin stem 14 so as to force the latch about its pivot 25 from the position shown in Figure 3 to the position shown in Figure 4, and in this movement the edge 31 of this portion 29 will slide along the edge 32 and inner surface 33 of the gate, pressing upon these surfaces 32 and 33 to force the gate about its pivot 23 and swing the gate from the position shown in Figure 3 to the position shown in Figure 4. In order that the latch and gate may be held in this closed position, I provide a recess 35 in the latch and a projection or detent 36 on the gate so that as these surfaces slide one upon the other, there will be an interlocking engagement or entrance of the projection into the recess to hold the parts in closed position and prevent the outward pressure of the pin stem 14 from opening the gate.

The latch is also provided with a projection 37 which extends downwardly so as to engage the end 38 of the gate and limit opening movement of the gate and latch so that their limit of opening movement will be as shown in Figure 3. Thus, when the pin stem is inserted as shown by the arrow 40 in Figure 3, it will engage the recess 30 and upon further movement will swing the latch and in turn the latch will swing the gate to the closed position, passing through the position shown in Figure 4 until they reach the position shown in Figure 2 where they will be locked and an outward pressure of the pin stem on the gate will not swing the gate to open position, it being necessary for manual manipulation of the handle 28 in order to accomplish such opening.

I claim:

1. A safety catch comprising a base, a pair of arms fixed in spaced relation to the base and providing a U slot opening outwardly away from the base to receive between the arms a pin stem to be retained, said arms being of a sufficient length to engage the pin stem and support lateral pressure therefrom in opposite directions, a gate pivoted to one of said arms and having a portion on one side of the pivot to swing from the arm on which it is pivoted completely across said slot to the other arm and thereby cross the path of movement of a pin stem in its movement into the space between said arms to block the removal of the pin stem from between the arms and also having a portion on the other side of said pivot, and a latch pivoted on the other of said arms having a portion extending across said slot from the arm on which it is pivoted to the other arm and in the path of movement of the pin stem when inserted between said arms to be moved by the pin stem against that portion of said gate on the other side of the pivot causing it to move to closed position and hold said gate in locked position.

2. A safety catch as in claim 1 wherein the pivot of said gate and pivot of said latch extend parallel to the plane of movement of the pin stem as it enters between said arms.

3. A safety catch as in claim 1 wherein the gate and latch move in the same planes and a portion on one side of the pivot of the latch slides along a portion on one side of the pivot of the gate and said sliding portions have interlocking means to hold them in one relative position.

4. A safety catch as in claim 3 wherein said interlocking occurs when the gate is in closed position.

5. A safety catch as in claim 1 wherein the gate and latch move in the same plane and a portion on one side of the pivot of the latch swings into engagement with a portion on one side of the pivot of the gate and provides a stop for both to limit opening movement of the gate and latch.

6. A safety catch comprising a base, an arcuate gate extending through substantially 180 degrees of arc pivoted intermediate its ends to said base at such location that the head of the gate will swing over the pin stem to be engaged thereby when in closing position and the opposite or tail end of the gate will swing under the path of movement of the pin stem when the gate is in open position and a latch also pivoted intermediate its ends on the base in the plane of said gate with an end portion on one side of the pivot slidably engaging the tail portion of said gate and also in the path of movement of the pin stem to be engaged by the pin stem when moved in one direction only to be swung about its pivot and in turn swing the gate about its pivot from open to closed position, said gate being alone engaged by the pin stem in a movement in the other direction and the portion of the latch on the other side of its pivot being clear of the path of movement of the pin stem, and interlocking means along said sliding surfaces to hold the parts in closed position.

7. A safety catch as in claim 6 wherein the interlocking means comprises a recess and a detent to enter said recess.

BERNARD LEROY DILL.

REFERENCES CITED

The following references are of record in the file of this patent:

UNITED STATES PATENTS

| Number | Name | Date |
|---|---|---|
| 594,541 | Kilbourn | Nov. 30, 1897 |
| 1,040,787 | Seiltz | Oct. 8, 1912 |
| 1,262,537 | Massa | Apr. 9, 1918 |